May 13, 1947. H. J. MENGE 2,420,608
PROTRACTOR FOR USE IN NAVIGATION
Filed Dec. 5, 1942 2 Sheets-Sheet 1
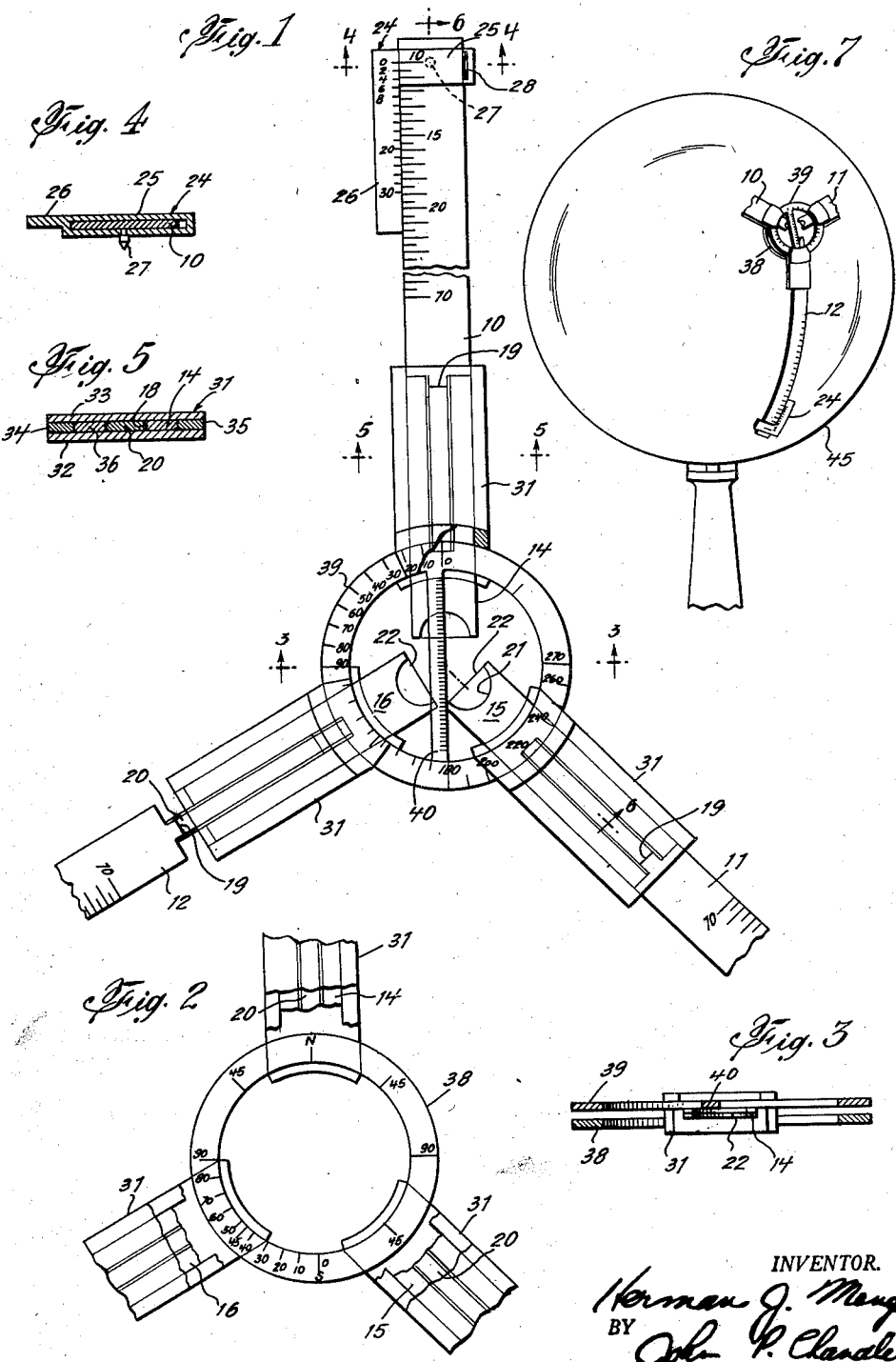
INVENTOR.
Herman J. Menge
BY John P. Chandler
his attorney May 13, 1947.  H. J. MENGE  2,420,608
PROTRACTOR FOR USE IN NAVIGATION
Filed Dec. 5, 1942   2 Sheets-Sheet 2
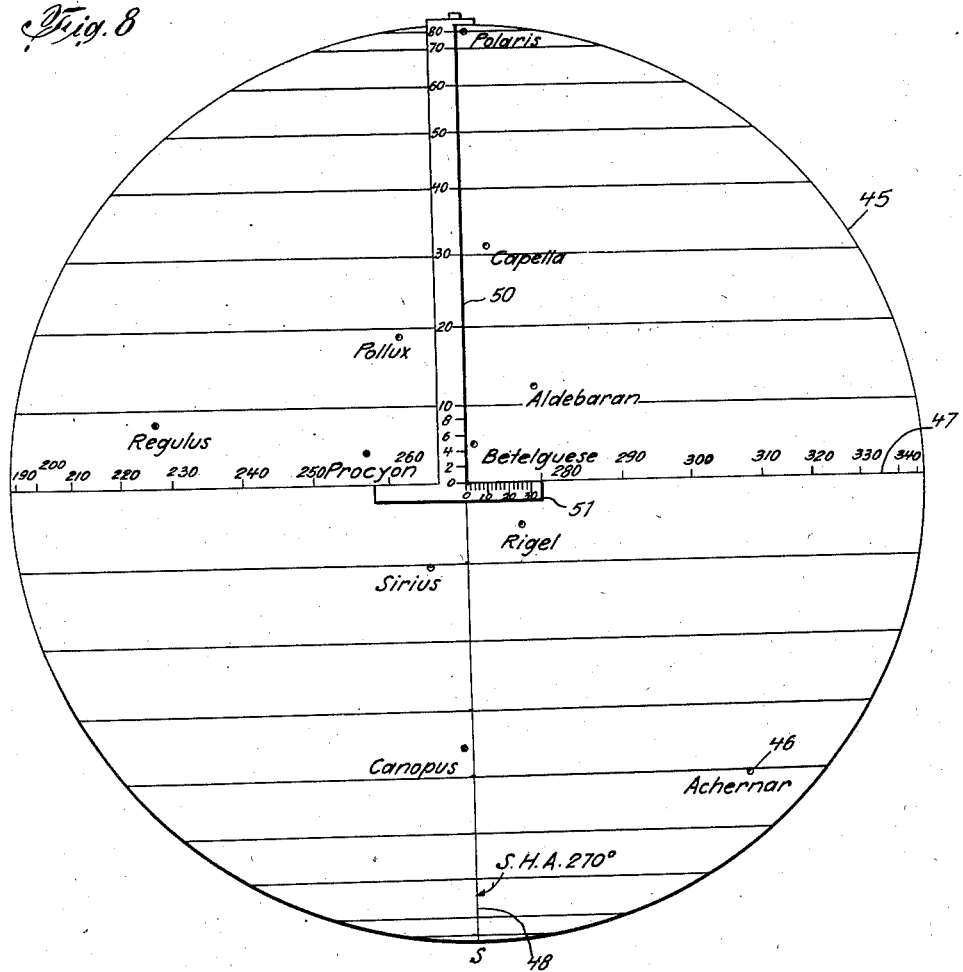
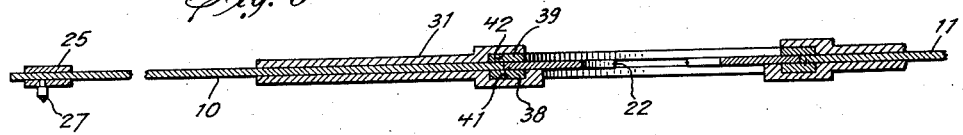
INVENTOR.
Herman J. Menge
BY John P. Chandler
his attorney Patented May 13, 1947

2,420,608

UNITED STATES PATENT OFFICE 2,420,608

PROTRACTOR FOR USE IN NAVIGATION

Herman J. Menge, Middle Village, N. Y.

Application December 5, 1942, Serial No. 467,969

12 Claims. (Cl. 33—1)

My invention relates to the art of navigation, and more particularly to the art of position finding. During normal times, an aircraft usually checks its position by means of radio beams, identification of known objects, and less frequently by observation of the altitudes of celestial bodies. It is an accepted and proven fact that the value of radio beams for this purpose diminishes as the distance from the beacon increases. The accuracy of the radio beam is also disturbed by many factors too numerous to mention, and a pilot following such a beam frequently finds himself far off his course. Moreover, in times of war the use of the radio beam has to a large extent been discontinued, necessitating greater dependency upon obtaining a position from celestial bodies, and as a result the navigator of the craft must check his position from time to time by methods presently in use which require extensive calculations to establish a "fix." Since the calculations are necessarily quite extensive and relatively complex, the possibility of error is very great, particularly since the mind of the navigator while in flight cannot function as clearly and accurately as under normal conditions.

The principal object of the present invention is the provision of an improved system of calculating positions through the aid of celestial bodies which will reduce the human error element to a minimum, and, more important still, will reduce the time involved in establishing the fix from upwards of twenty minutes, when calculated according to existing methods, to a mere fraction of this time. Another object of the present invention is to provide a novel instrument for use in celestial navigation which will permit the navigator to establish his position within a minute, or thereabouts, and thus obtain a direct reading of latitude, requiring no corrections of any character, and also a tentative position which, through the application of a minor calculation, will establish his longitude.

For the purpose of better illustrating the system and apparatus of my invention, and particularly to point out the extreme novelty and simplicity in the method whereby an accurate fix can be quickly calculated, it may be desirable to make passing reference to the systems of position finding now most currently in use, namely, the manual plotting of lines of position on a chart after reference has been made to ponderous tables in order to ascertain two values, which, after further calculation, are plotted in a complex manner to give a cross or triangle designating the craft's position at the time of last observation. This general method consists in using objects in a celestial sphere, and in order to plot them it is necessary to give them earthly coordinates based upon the earth being a cylinder rather than a sphere. It is believed that all of the system of celestial position fixing currently in use, such as those known officially as H. O. 208, H. O. 211, H. O. 214 and H. O. 218 employ some modification of this general method wherein lines of position are manually plotted to give an earthly position. The method of the present invention is a radical departure from all these methods in that it mechanically determines a celestial position which is quickly and easily converted to an earthly position.

For the purpose of more clearly and explicitly pointing out how the method of the present invention completely reverses the earlier teachings of the art, the steps involved in one of the representative systems now in use, namely H. O. 214, will be very briefly outlined:

1. We first obtain the altitudes of a group of celestial objects, preferably three, and the exact time of each observation noted.

2. These altitudes are corrected for all known errors, including errors due to refraction as well as errors inherent in the instruments.

3. We work up a dead-reckoning position to assist in approximating our assumed position. In the event that we were starting from any given position and were to travel to any other part of the earth, we would require nine substantial volumes of latitude and azimuth tables according to the H. O. 214 method (18 volumes according to the H. O. 218 method). The values extracted from the tables are then subject to interpolation due to the fact that the tables give readings from nothing less than whole-degree factors. This fact necessitates our adopting an assumed position, which is different from our dead-reckoning position, and which we know to be erroneous.

4. We next refer to the Air Almanac for the Greenwich hour angle of each body, as well as its declination, to coincide with the exact time of observation. In this step the star or sidereal hour angle and the hour angle of Aries (interpolated) are added to give the Greenwich hour angle of the star.

5. From the Greenwich hour angle and the assumed longitude we determine the local hour angle from our assumed meridian.

6. We next go to the tables with this local hour angle, dead-reckoning latitude and declination, and extract a computed altitude for our assumed position, and also an azimuth for the body observed.

7. We compare the computed altitude with the corrected observed altitude, the differences being our intercept.

8. We repeat this with respect to the other two observations.

9. We then go to a plotting sheet and plot the assumed positions for the individual observations.

10. We advance two of these assumed positions for distance travelled between the first two and the last observation.

11. From these assumed positions we then plot a line of bearing on which, according to intercept, we spot a point to plot a line of position.

12. This we follow through with all three intercepts, giving us a triangle according to bearing of stars observed.

13. The triangle is then bisected, the center being our position at time of last observation.

14. The track from our last point of departure carried through our fix and advanced an amount to coincide with our distance travelled then gives us our position at the completion of calculation.

Certain of the foregoing calculations are made necessary by virtue of the fact that there is a time interval between the individual altitude observations of the three bodies. It is obvious that in any system of fixing positions by the observation of celestial bodies, it would be considerably simplified if all three observations were to be made and completed at substantially the same instant, and the same is true both of the system of H. O. 214 and the system of the present invention. The system of the present invention will, however, be described according to the steps followed when the three observations are made simultaneously as well as when they are made successively with a time lag of two or three minutes between each observation. In any event, the first two steps in the H. O. 214 system are followed in the system of the present invention, and virtually all the other steps are eliminated.

My present improved system involves the use of two instruments, one a novel protractor having a plurality of radially disposed altitude arms which are revolvable about a common center independently of each other. The other instrument is a celestial globe of predetermined diameter relative to the length of the altitude arms having lines marked thereon to represent declination and hour angle which correspond to the latitude and longitude of earthly positions. The surface of the globe is further provided with a plurality of spaced apertures corresponding to the celestial position or coordinates of the bodies they represent. The name of each body is preferably printed on the globe adjacent to the aperture. The sphere is further provided with a position-finding instrument or scale which is employed to give a direct reading of latitude and hour angle when fix has been ascertained.

Each altitude arm is provided with a support, the three supports being mounted for independent, relative rotation to each other. At the inner end of each altitude arm a cross-hair is provided extending the major portion of its width. Each arm is provided with graduations in degrees wherein the cross-hair represents 90°, and the graduations extend usually from 70° to 10°, the latter graduation being adjacent to the outer end of each arm. A vernier attachment is slidably carried by each arm and means are provided for setting the vernier attachment at any desired position upon the arm. The vernier slide is further provided with a pin on its lower surface which, when the vernier has been set, is positioned within the appropriate aperture on the globe corresponding to the star observed.

The altitude of three individual stars is now obtained. The stars selected for any given fix is a matter of choice, although it is preferred to select stars lying at an azimuth bearing substantially 120° from each other. Thus, one altitude arm is employed for each star observed, and if the first reading is, for instance, 30° altitude, the vernier carried on the arm selected for such star is set at a point wherein the zero reference line is opposite the 30° mark on such altitude arm, and is accordingly 60°, in such case, from the central reference line or crosshair.

In the event that the altitudes of the three bodies are determined at the same instant, the vernier carried on the other two altitude arms are set in the same fashion. The next step is to position the pin of each vernier slide in the proper aperture in the globe. In order to position the pins in the appropriate openings in the globe, the several altitude arms must be rotated in one direction or the other. In the event that the altitudes have been correctly ascertained and the protractor is accurate, and likewise the apertures in the globe are accurately placed, when the pins have been placed in their appropriate apertures the cross-hairs at the inner terminals of the altitude arms should coincide, the point of such coincidence being our celestial position.

In the event that some error has crept into the ascertaining of the altitude, the cross-hairs may form a triangle. If the cross-hairs coincide, a point is registered or marked on the globe at the place of such intersection, or in the event that a triangle is formed by the cross-hairs, the angles of the triangle are bisected and a point marked at the center of such triangle. It can be seen that this establishes our zenith in the celestial sphere, which method of position finding has until now been disregarded. To determine the value of this position we have a position finding scale associated with the sphere which gives the exact declination of the spot which is our latitude, the lower end being so fashioned as to give a sidereal hour angle reading from divisions projected on the sphere at the celestial equator.

This sidereal hour angle reading is readily converted to longitude by the following simple calculation: The exact Greenwich hour angle of Aries is applied (added) to it, giving the Greenwich hour angle which is converted to longitude as follows: If total is over 360, deduct 360. If the balance is under 180, result is longitude west. If the balance is over 180, subtract it from 360 and the result is longitude east. The method which is followed if the sights are taken successively with time intervals between will be discussed hereinafter.

It will be seen from this general discussion of the system of the present invention that all dead-reckoning calculations to establish an assumed position which must, of necessity, be an erroneous position, is entirely eliminated. The use of the instruments forming the present invention will be pointed out at greater length after the drawing has been referred to in more detail.

In the drawings:

Fig. 1 is a broken plan view of the novel protractor forming one of the instruments of the present invention.

Fig. 2 is a plan view of the azimuth ring, the view also showing the general arrangement of the protractor arms.

Figs. 3, 4, 5 and 6 are sections taken on lines 3—3, 4—4, 5—5 and 6—6, respectively, of Fig. 1.

Fig. 7 is a general view of the celestial globe and showing the manner in which the protractor is applied to the surface of the globe.

Fig. 8 is a plan view of the celestial globe with certain celestial bodies indicated adjacent appropriate apertures, the view also showing the position-finding scale associated with the globe.

The protractor of the present invention includes three altitude arms 10, 11 and 12, respectively. At their inner ends the altitude arms are provided with extension members 14, 15 and 16, respectively, such extension members having an elongated slot extending from their outer ends the major portion of their length. The opposed edges of the slot are recessed, as shown at 18 in Fig. 5, thus forming slideways or recessed tracks which receive the inner terminals 20 of the altitude arms in slidable relation. Both the extension members and the altitude arms may be formed from transparent plastic material or even metal, if desired. Inasmuch as the protractor is applied to the surface of the celestial globe and the arms bent to assume the curvature of the globe, it is preferable to form these arms from material which will bend readily. It will accordingly be seen that each altitude arm is slidably mounted on its inner extension, and the purpose for providing such slidability will be pointed out hereinafter. For present purposes, it is sufficient to say that the inner terminal 20 is provided with a reference mark 19 which is positioned in line with the outer terminal of the inner extension as a starting position.

The inner terminals of extension members 14, 15 and 16 are formed with semi-circular, cut-out portions 21, and a cross-hair 22 is secured at the opposed terminals formed by such cut-out portions. Each altitude arm is further provided with a scale having graduations representing degrees. The cross-hair 22 is considered as the 90° reference line on said scale when outer terminus of extension is in line with reference mark 19 on altitude arm proper, and the detailed graduations may run from 70°, or thereabouts, down to 10° at the outer end of the altitude arms. For convenience, these graduations include half-degree markings. Each altitude arm further includes a conventional vernier slide 24 having a sleeve portion 25 which is mounted on the altitude arm, and a vernier scale 26. On the lower surface of sleeve portion 25 a pin 27 is secured, such pin being adapted to be received within any one of a plurality of apertures 46 in the celestial globe, to be later described. Any suitable means may be employed for restraining movement of the vernier slide relative to the altitude arm, such as a spring element 28, or a more positive retaining means, such as a clamping screw. The pin 27 is positioned in alignment with the zero reference line of the vernier slide, as shown in Fig. 1.

Each extension member forming part of the altitude arm is slidably mounted in a support or sleeve 31. One method of forming this support is shown in Fig. 5, the support including a lower wall 32, an upper wall 33, and opposed side members or spacers 34 and 35, thus providing a channel 36 which receives the inner extension of the altitude arm. The supports are mounted for arcuate movement on a pair of spaced rings comprising a lower azimuth ring 38 and an upper, course-setting ring 39. The azimuth ring is provided with north and south reference marks, and each 90° section is provided with degree graduations running from 0° to 90°. It will be noted in Fig. 2 that these azimuth ring graduations are graduated from the north and south zero marks to a 90° or quarter-circle division. The course-setting ring is also provided with degree graduations running in a counter-clockwise direction. It is further formed with a transverse scale 40 having graduations thereon which will be explained hereinafter. At the inner end of each support or sleeve 31 a lower arcuate slot 41 is formed which receives lower or azimuth ring 38 as shown in Fig. 6. The support is further provided with an upper arcuate slot 42 which receives upper or course-setting ring 39. It will accordingly be seen that the radially disposed, altitude-arm supports 31 may be moved to any desired position with reference to rings 38 and 39.

Whereas the protractor element just described is convenient in operation since it provides an open central field to permit marking the center of a triangle formed by the three cross-hairs, it will nevertheless be appreciated that the structure of the protractor element can be modified considerably without departing from the spirit of the invention. For instance, the sleeves 31 could be pivotally mounted at the center of a transparent support instead of providing the arcuate slots in such sleeves and mounting the sleeves on the rings. This construction would be adequate if altitudes were taken under perfect conditions simultaneously. It will also be appreciated that the vernier slides in the altitude arms could be dispensed with and the pins 27 merely mounted on a sleeve which is slidable longitudinally of such altitude arms. The vernier slide, however, permits of much finer adjustment. Likewise, the altitude arms could be formed in one piece only, thus dispensing with the inner extensions 14, 15 and 16.

The dimensions of the celestial globe 45 are of necessity in direct relation to the length of the altitude arms. That is to say, 10° on the globe represent the same linear measurement as 10° on the altitude arm. The globe is provided with a plurality of spaced apertures 46 corresponding to the celestial coordinate of the respective celestial bodies which are named adjacent to the appropriate apertures. The globe is further provided with a great circle reference line 47 corresponding to the celestial equator. This celestial equator is provided with degree graduations, the graduations representing hour angle divisions in the celestial sphere. The sphere is further provided with another great circle reference line 48 representing any selected meridian. In the instance shown, this latter reference line represents the sidereal hour angle of 270°.

A position-finding scale 50 is pivoted at one of the poles and has an effective length equal to 90° on the surface of the sphere. This scale is provided with graduations in degrees from zero to 90°, and is further formed with a T shaped extension 51 having vernier markings thereon. Only one of such scales need be provided, and as long as one is working north of the equator the scale may be journalled at the North Pole, and reversed to the South Pole when working in southern latitudes.

The steps employed in establishing a position which were previously set forth in a general way will now be outlined in somewhat more detail. It was previously pointed out that the first step in the present method of position fixing consists in observing the altitudes of three celestial bodies. In the event that this is accomplished by means of a sextant or octant capable of obtaining three sights simultaneously, the altitudes of the several bodies are noted, the respective vernier slides on the altitude arms set, and the pins carried by each slide placed in the appropriate apertures representing the celestial bodies whose altitudes have been observed. In order to position the pins in these respective apertures, it will, of course, be necessary to adjust the relative angles of the several altitude arms, which can be accomplished by merely moving the respective sleeves 31 on the supporting rings.

In the event that the altitudes have been correctly observed, the cross-hairs at the inner terminals of the three altitude arms will coincide. The point of such coincidence is then marked upon the globe and the protractor removed. The position-finding scale is then moved to a position wherein its reference edge coincides with the point marked. In other words, the declination indicated by the scale is the latitude of the position. Longitude is now determined in the following manner. At the base of the extension scale 51 a zero point furnishes us with an hour angle position in degrees of the point which has been previously marked as establishing our position in the celestial sphere. Further reference to the vernier calibrations will give the accurate minute reading of this hour angle. To this hour angle obtained is then applied the Greenwich hour angle of the first point of Aries, which is converted to longitude as follows. If total is over 360, deduct 360. If the balance is under 180, the result is longitude west. If the balance is over 180, subtract it from 360 and the result is longitude east. It will be appreciated that if the scale 50 is formed of transparent material, the transverse extension 51 need extend in one direction only rather than in the T shaped formation shown in Fig. 8, since when working in southern latitudes the scale may be merely reversed.

The steps made necessary by the time interval between successive altitude observations will now be outlined. It is obvious that we must now consider the changed altitudes of the celestial bodies due to the earth's rotation, as well as the movement of the craft. On the subject of this altitude change, to be referred to as hour angle change, I provide the following altitude correction table.

*Altitude corrections for 1° change of H. A.*

[Latitude 0°. North or south declination]

| Bearing | Declination | | | | | | | | | | | | |
|---|---|---|---|---|---|---|---|---|---|---|---|---|---|
| | 5° | 10° | 15° | 20° | 25° | 30° | 35° | 40° | 45° | 50° | 55° | 60° | 65° |
| 10° | 5' | 9' | 10' | 10' | 10' | 11' | 11' | 11' | 11' | 11' | 11' | 11' | 11' |
| 20° | 17' | 19' | 20' | 20' | 20' | 21' | 21' | 21' | 21' | 21' | 21' | 21' | 21' |
| 30° | 27' | 27' | 28' | 30' | 30' | 30' | 30' | 30' | 30' | 30' | 30' | | |
| 40° | 40' | 39' | 39' | 40' | 39' | 39' | 39' | 39' | 39' | 39' | | | |
| 50° | 43' | 46' | 46' | 46' | 46' | 46' | 46' | 45' | | | | | |
| 60° | 53' | 53' | 52' | 52' | 52' | 51' | | | | | | | |
| 70° | 57' | 57' | 57' | 56' | | | | | | | | | |

*Hour angle change*

FACTORS FOR TIME BETWEEN SHOTS

| Time | 12'' | 24'' | 36'' | 48'' | 1'00'' | 1'12'' | 1'24'' | 1'36'' | 1'48'' | 2'00'' |
|---|---|---|---|---|---|---|---|---|---|---|
| Factor | .05 | .10 | .15 | .20 | .25 | .30 | .35 | .40 | .45 | .50 |

This altitude correction table is effective for use in latitude 0° to 5° declination north or south, and other appropriate tables for each 5° of latitude declination, same or contrary name, will bring the number of needed tables up to 18. This constitutes a very small volume, particularly as contrasted with the voluminous and ponderous data required in H. O. 214.

After altitudes have been set on the altitude arms as in the foregoing description, their relative bearing to the zero reference point on the azimuth ring is noted. The declination of the observed body is also noted. With these two values we enter the hour angle altitude correction table and extract an altitude correction factor to which we apply a multiplicant according to the time interval elapsed between the respective and the last observation. The result is then applied—plus if object is on upper transit, and minus if object is on lower transit—to the vernier settings on the altitude scale arm. This is repeated with the second observation. This compensates for the change in hour angle of the celestial bodies between observations. To compensate for the movement of the craft we rotate the course-setting ring to a position to correspond with the direction of the craft's travel. We then advance or retract the inner extension 14 of the altitude arm a distance to correspond to the craft's travel between the respective observation and the last. We follow this with the second observation, the crossing point or center of the triangle giving our celestial fix.

It will be appreciated that in the event all observations have been accurate and the protractor arms have been accurately manipulated, the cross-hairs will coincide at a common point. In actual practice, however, such accuracy is not obtainable, particularly when the altitude observations have been made from a moving plane. Accordingly, in almost every instance the cross-hairs will not coincide but will form a triangle. The center of the triangle is then determined and the point marked on the globe, as previously stated. It was earlier pointed out that a recess 21 is formed at the inner terminal of the inner extensions of the altitude arms, and that the cross-hair 22 is secured at the opposed terminals formed by such recess. The purpose for the recess is as follows.

In practice it has been found that perfect altitude observations are seldom obtained. If altitudes have all been undershot, it is obvious the cross-hairs will form an "outside" triangle. If, on the contrary, the altitudes have been overshot, the cross-hairs will form an "inside" triangle. In actual practice we may overshoot one angle and undershoot another, but in any event the result is the formation of a triangle whose center can be readily ascertained and the point marked on the globe. In other words, the errors which may have been made are, in part, compensated for and averaged.

The protractor of the present invention utilizing, as it does, three altitude arms, could, of course, be dispensed with and a single altitude scale employed instead in the following manner. The altitudes of the three celestial bodies are first observed. The altitude of the first body, say 40°, is then set on the altitude scale and the zenith distance, namely, the difference between the 40° and 90°, utilized by the scale for the purpose of plotting on the celestial globe an arcuate line of determined radius. This could be done by placing the pin on the movable reference element in the appropriate aperture on the celestial sphere, affixing a pencil or other marking element at the opposite end of the scale, and then drawing the arc. This step is repeated with respect to the other two altitude observations, and the point of coincidence determines our position on the celestial sphere, namely, our zenith point. This value can then readily be converted into earthly latitude and longitude in the manner previously in the manner previously described.

The method and apparatus of the present invention will find its greatest use in establishing a fix from an aircraft in travel. It is equally useful, however, when establishing fixes from a ship on the sea, or otherwise, and in the event that the travel of the particular craft is relatively slow, as in the case of a ship, a more simplified protractor element can be provided, as will also be the case if the sights were taken simultaneously. The drawings are generally schematic in character and are not intended as working drawings, but, on the contrary, are merely offered for the purpose of clearly describing the nature of the invention. For instance, the celestial globe will, in all events, have meridian markings spaced 5° or 10° apart, as is common with globes of this general character. Many other modifications and changes may be made in both the globe and the protractor without departing from the spirit of the invention, as defined by the appended claims.

What I claim is:

1. A protractor of the character described for use in connection with a celestial globe having apertures therein corresponding to positions of known celestial bodies, said protractor including a plurality of altitude arms which are independently movable radially about a common center, supporting means providing such common center, each altitude arm being longitudinally movable relative to the common center, and a reference line at the inner terminal of each altitude arm, the arms having degree graduations marked thereon.

2. A protractor of the character described for use in connection with a celestial globe having apertures therein corresponding to positions of known celestial bodies, said protractor including a plurality of altitude arms which are independently movable radially about a common center, supporting means providing such common center, a pair of rings forming, respectively, as azimuth ring and a course-setting ring associated with said supporting means, the azimuth ring having north and south reference marks and degree graduations from 0° to 90° in each quarter section, the course-setting ring having 360° graduations disposed counter-clockwise and being provided with a transversely extending graduated scale, a cross-hair at the inner terminal of each altitude arm representing a 90° reference line, the arm having descending degree graduations thereon, a vernier slide carried on each arm, and a pin carried by each vernier slide adjacent the zero reference line thereon, such pin being receivable in one of the apertures in the globe.

3. A protractor of the character described for use in connection with a celestial globe having apertures therein corresponding to positions of known celestial bodies, said protractor including a plurality of altitude arms which are independently movable radially about a common center, supporting means providing such common center comprising a pair of spaced, aligned rings forming, respectively, an azimuth ring and a course-setting ring, the azimuth ring having north and south reference marks and degree graduations from 0° to 90° in each quarter section, the course-setting ring having 360° graduations disposed counter-clockwise and being provided with a transversely extending graduated scale, altitude arm supporting means slidably carried by such rings, such altitude arms being longitudinally movable relative to such supporting means, a cross-hair at the inner terminal of each altitude arm representing a 90° reference line, the arm having descending degree graduations thereon, a slidable element carried on each arm, and a pin carried by each element, such pin being receivable in one of the apertures in the globe.

4. A protractor of the character described for use in position fixing in connection with a celestial globe having apertures therein corresponding to positions of known celestial bodies, said protractor including a plurality of altitude arms which are independently movable radially about a common center, supporting means providing such common center comprising a pair of spaced, aligned rings forming, respectively, an azimuth ring and a course-setting ring, the azimuth ring having north and south reference marks and degree graduations from 0° to 90° in each quarter section, the course-setting ring having 360° graduations disposed counter-clockwise and being provided with a transversely extending graduated scale, a plurality of sleeves having arcuate slots therein mounted on such rings and being radially rotatable relative thereto, the rings being positioned in such slots, each altitude arm being longitudinally journalled in one of such sleeves and comprising inner and outer terminal portions which are longitudinally movable relative to each other, a cross-hair at the inner terminal of each altitude arm representing a 90° reference line, the arm having descending degree graduations thereon, a vernier slide carried on each arm, and a pin carried by each vernier slide adjacent the zero reference line thereon, such pin being receivable in one of the apertures in the globe.

5. In the art of determining unknown earthly positions, a celestial globe having a plurality of relatively spaced marked apertures thereon, each aperture being located at a position corresponding to the celestial position of an identified fixed celestial body, in accordance with the said markings and a protractor which is applied to the surface of such globe to establish a zenith point corresponding to the unknown earthly position, said protractor including a plurality of altitude arms which are radially movable about a common center, supporting means providing such common center comprising a pair of spaced, aligned annular elements forming, respectively, an azimuth ring and a course-setting ring, and sleeves having arcuate slots therein mounted on such annular element, each sleeve carrying one of such arms, the arms having ascending degree graduations marked thereon from their outer terminals to 90° at their inner terminals, and pivotal means for engaging any point along the length of each of said altitude arms with said apertures on the globe at the locations corresponding to the positions of any said celestial body markings.

6. In the art of determining unknown earthly positions, a celestial globe having apertures therein, each aperture being located at a position corresponding to the celestial position of an identified celestial body, and a protractor which is applied to the surface of such globe to establish a zenith point corresponding to the unknown earthly position, said protractor including a plurality of altitude arms which are radially movable about a common center, and supporting means providing such common center comprising an annular element, the arms having ascending degree graduations marked thereon from their outer terminals to 90° at their inner terminals, and a slidable element carried by each arm which is receivable in one of the apertures in the globe.

7. Means for determining unknown earthly positions comprising, in combination, a celestial globe having apertures therein, each aperture being located at a position corresponding to the celestial position of an identified celestial body, and a protractor which is applied to the surface of such globe to establish a zenith point corresponding to the unknown earthly position, said protractor including a plurality of altitude arms which are radially movable about a common center, supporting means providing such common center comprising an annular element, an azimuth ring and a course-setting ring associated with said annular element, sleeves having arcuate slots therein mounted on such annular element, each sleeve carrying one of such arms, the arms having ascending degree graduations marked thereon from their outer terminals to 90° at their inner terminals, and a vernier slide carried by each arm and being provided with a pin on its rear surface opposite the zero reference line, which pin is receivable in one of the apertures in the globe.

8. In the art of determining unknown earthly positions, a celestial globe having apertures therein, each aperture being located at a position corresponding to the celestial position of an identified celestial body, and a protractor which is applied to the surface of such globe to establish a zenith point corresponding to the unknown earthly position, a position-finding scale associated with the globe, said protractor including a plurality of altitude arms which are radially movable about a common center, supporting means providing such common center comprising an annular element, sleeves having arcuate slots therein mounted on such annular element, each sleeve carrying one of such arms, each arm having at its inner terminal an extensible section, the arms having ascending degree graduations marked thereon from their outer terminals to 90° at their inner terminals, a cross-hair at the 90° reference line of each arm, a vernier slide carried by each arm and being provided with a pin on its rear surface opposite the zero reference line, which pin is receivable in one of the apertures in the globe.

9. A protractor for use in connection with a celestial globe having indicated positions thereof corresponding to known positions of preselected celestial bodies, said protractor having in combination a plurality of altitude arms movably connected at their inner ends and free to move at their other ends, each arm having an altitude scale indicated thereon, a movable vernier slide mounted on each altitude arm and having a scale thereon calibrated to the scale of its said arm, and means carried by each vernier slide for removably engaging said globe at any of the indicated positions of said celestial bodies.

10. A protractor of the character described for use in connection with a celestial globe having indicated positions thereon corresponding to known positions of preselected celestial bodies, said protractor comprising a ring-like central support, separate altitude arms connected with said central support and independently adjustable to different angular positions, each of said arms having an altitude scale thereon, a vernier slide movably mounted on each arm and having a scale calibrated to the scale of said arm, and a protuberance on the underside of the vernier slide for engaging said globe at any of the indicated positions thereon of said celestial bodies.

11. Position determining means of the character described having in combination a celestial globe provided with a plurality of relatively spaced apertures, each aperture representing a position corresponding to the known celestial position of an identified celestial body, a protractor having a plurality of altitude arms connected at their inner ends and free at their outer ends, each of said arms having an altitude-indicating scale, and a vernier slide movably mounted on each arm and calibrated to the altitude-scale thereof, each vernier slide having a projection on its underside engageable with any of said apertures.

12. A device for mechanically determining an observer's zenith from the observed altitudes of three celestial bodies, comprising a celestial globe having positions of various celestial bodies indicated thereon by marked apertures, a protractor for use therewith having three altitude arms marked off from 0° to 90°, means loosely connecting the 90° ends of said arms for limited relative movement, said ends being provided with hair-lines at their 90° positions stretched across an opening therein, means slidingly mounted on each arm and adjusted to the observed altitudes, means for pivotally connecting each of said slidingly mounted means with the apertures on said globe at the corresponding celestial body positions, the observer's zenith being then indicated by the intersection of the hair-lines on the overlapping ends of the arms.

HERMAN J. MENGE.

REFERENCES CITED

The following references are of record in the file of this patent:

UNITED STATES PATENTS

| Number | Name | Date |
|---|---|---|
| 1,175,612 | Cresse | Mar. 14, 1916 |
| 2,087,970 | Hannah | July 27, 1937 |
| 464,261 | Beehler | Dec. 1, 1891 |
| 1,016,176 | Roca | Jan. 30, 1912 |

FOREIGN PATENTS

| Number | Country | Date |
|---|---|---|
| 3,645 of 1813 | Great Britain | July 29, 1813 |
| 946 of 1866 | Great Britain | Apr. 3, 1866 |

OTHER REFERENCES

Publication: Civil Aeronautics Bulletin #24, Sept. 1940, U. S. Dept. of Commerce, pages 172–174 and page 192.